United States Patent
Raudaschl

(10) Patent No.: US 8,874,908 B2
(45) Date of Patent: Oct. 28, 2014

(54) PROCESS FOR STORING DATA ON A CENTRAL SERVER

(71) Applicant: Wolfgang Raudaschl, Vienna (AT)

(72) Inventor: Wolfgang Raudaschl, Vienna (AT)

(73) Assignee: Wolfgang Raudaschl, Vienna (AT)

( * ) Notice: Subject to any disclaimer, the term of this patent is extended or adjusted under 35 U.S.C. 154(b) by 80 days.

(21) Appl. No.: 13/670,631

(22) Filed: Nov. 7, 2012

(65) Prior Publication Data

US 2014/0129830 A1    May 8, 2014

(51) Int. Cl.
*H04L 29/06*    (2006.01)
*G06F 21/62*    (2013.01)

(52) U.S. Cl.
CPC ........ *H04L 63/0428* (2013.01); *G06F 21/6218* (2013.01)
USPC ........... 713/165; 713/179; 713/181; 713/184; 713/189; 726/27

(58) Field of Classification Search
USPC ....................................................... 713/165
See application file for complete search history.

(56) References Cited

U.S. PATENT DOCUMENTS

| 8,543,827 | B2 * | 9/2013  | Garcia et al.   | 713/184 |
| 8,613,102 | B2 * | 12/2013 | Nath            | 726/27  |
| 8,707,034 | B1 * | 4/2014  | Ryan            | 713/165 |
| 8,739,302 | B2 * | 5/2014  | Vainstein et al.| 726/27  |
| 2002/0157016 | A1 * | 10/2002 | Russell et al.  | 713/200 |
| 2003/0208681 | A1 * | 11/2003 | Muntz et al.    | 713/179 |
| 2005/0201564 | A1 * | 9/2005  | Kayashima et al.| 380/283 |
| 2008/0320319 | A1 * | 12/2008 | Muller et al.   | 713/193 |
| 2009/0125726 | A1 * | 5/2009  | Iyer et al.     | 713/189 |
| 2010/0058013 | A1 * | 3/2010  | Gelson et al.   | 711/162 |
| 2010/0235644 | A1 * | 9/2010  | Oxford          | 713/181 |
| 2010/0332401 | A1 * | 12/2010 | Prahlad et al.  | 705/80  |

* cited by examiner

*Primary Examiner* — Kambiz Zand
*Assistant Examiner* — Yonas Bayou
(74) *Attorney, Agent, or Firm* — Matthew J. Booth & Associates PLLC; Matthew J. Booth

(57) ABSTRACT

This disclosure describes a process for storing data on a central server with a plurality of users, each of them having their own user password used for creating a user key, being respectively assigned to some of these users, and some of the data, being divided into data blocks to be uploaded, and each data block being compared to data blocks on the server based on a unique data block ID value in order to determine whether a corresponding data block is already stored on the server and to upload to the server those data blocks which are not already present, a data block list to be uploaded being created and uploaded to the central server, so that in a data recovery step data stored on the central server which are requested by the user can be restored in their original form based on said list.

19 Claims, 2 Drawing Sheets

FILE A

| BLOCK 1 (HASH OF BLOCK 1 ENCRYPTED) | BLOCK 1 TO BLOCK 4 IS ENCRYPTED WITH FILE - KEY (256 BIT HASH OF FILE) |
|---|---|
| BLOCK 2 (HASH OF BLOCK 2 ENCRYPTED) | |
| BLOCK 3 (HASH OF BLOCK 3 ENCRYPTED) | |
| BLOCK 4 (HASH OF BLOCK 4 ENCRYPTED) | |
| BLOCK 5 | LAST BLOCK + BLOCK LIST (BLOCK 1 TO BLOCK 4 (4 x 20 BYTE HASH + 4 BYTE NUMBER OF BLOCKS)), ENCRYPTED WITH FILE KEY |

PROCESS FOR STORING DATA ON A CENTRAL SERVER

TECHNICAL FIELD

The present invention relates to a process for storing data on a central server with a plurality of users, each of them having their own user password which is used at least for creating a user key, at least one client, and the data stored thereon, being respectively assigned at least to some of these users, and at least some of the data, as required, being divided into data blocks to be uploaded, and each data block being compared to data blocks on the server based on a unique data block ID value in order to determine whether a corresponding data block is already stored on the server and to upload to the server those data blocks which are not already present, a data block list to be uploaded being created and uploaded to the central server, so that in a data recovery step data stored on the central server which are requested by the user can be restored in their original form based on said list.

The term "data", as used herein, generally refers to any type of information, which is particularly organized in files, such as in the form of images, documents, programs, and archives. Data and data sets may originate from a data base server or include another type of information which, for example, is to be stored directly on the central server via the client's main memory. In the present document, the terms "files" and "data" are used interchangeably. The names of files correspond to a description of data, for example, and may thus be understood as the data's file name.

A central server also refers to a cloud in which a plurality of servers or server farms are optionally connected to each other, sometimes being located at different geographic locations. The term "server" hereinafter refers to such central servers. Central servers are operated by providers of online storage space (service providers), providing said online storage space and the resources required for server-side operations.

In most exemplary embodiments, the term "central server" will refer to an external server which is connected to the user via an information network, such as via the Internet. The central server may also only be accessible to the employees of a company in the company building.

The term "user", for example, covers private users and companies and their employees, a provider of online storage space having a plurality of users as customers.

In the present application, the term "client" is used to refer to PCs, laptops, netbooks, iPhones, and the like, i.e. to devices on which users store their data, for example as files and from which they might want to upload said data to the server. The clients execute an application which executes the individual steps of the process according to the respective embodiment.

It is assumed that the service provider uses an adequately encrypted connection according to the state of the art, such as an SSL (secure sockets layer) connection, for the data transfer between the server and the client.

In the present application and particularly in the appended claims, it is assumed that one-way functions are used. In this connection, one-way functions preferably are secure hash functions which, however, are only examples of known one-way functions. Modulo functions and, in a broader sense, the multiplication of two prime numbers are further examples of one-way functions.

When the application refers to encryption, a suitable encryption algorithm, preferably AES 256 bit, may be used for encrypting purposes.

This analogously also applies to the calculation of hash values; the inventor recommends using one of the 256 bit SHA3 finalists, as they are much faster than the SHA-256 algorithm.

It is possible for the service provider to classify the customers into different user groups, assigning different encryption rules to each of these user groups, etc. The users may, for example, be classified into Pro users who pay for their online storage space and Free users. Each encryption rule may also consist in a combination of two or more encryption keys.

It is noted that it is not necessary to use RSA or elliptic curves; they may, however, be optionally used as encryption algorithms. Asynchronous encryption algorithms are approximately 1000 times slower, however, which is why they should rather not be used.

According to the Gartner Group and other IT market research companies, cloud computing is one of the most important IT trends for the near future.

Cloud computing offers customers a dynamic scaling of resources on the Internet and the advantage that they only pay for the resources that they really use and only for the period of time in which they use them. In addition, it is also possible to share resources, within a company and/or with other customers or partners, resources being defined as storage space, processing power, services, etc.

A very important aspect of working in the cloud consists in the high availability of resources and in the high security guaranteeing that data will not be lost and that unauthorized third persons may be able to view data and protocols, but are not able to read or manipulate them.

The different types of cloud computing are subdivided into the following categories:
  SaaS Software as a Service (network-hosted application)
  DaaS Data as a Service (customer queries against provider's database)
  PaaS Platform as a Service (network-hosted software development platform)
  IaaS Infrastructure as a Service (provider hosts customer VMs or provides network storage)
  IPMaaS Identity and Policy Management as a Service (provider manages identity and/or access control policy for customer)
  NaaS Network as a Service (provider offers virtualized networks (e.g. VPNs))
  and are already used by millions of customers worldwide.

The present invention relates to cloud computing, primarily to DaaS services, but is neither limited to this type of service nor to its application in the field of cloud computing.

BACKGROUND ART

The US company Dropbox, for example, has been active in the field of cloud computing since 2008, and since 2011 it has already had 25 million customers, saving 200 million files every day. Dropbox offers its customers online storage space and a file version control system; what is special about this service is that the online storage space can not only be used as an online data backup, but that the files stored in this storage space may be kept in sync on a plurality of desired clients.

Other companies offering cloud services include Amazon, Google, Cisco, Microsoft, and many more. IBM, Microsoft, Oracle, Apple, consider cloud computing as the IT service which is expected to have the highest growth rates in the coming years and is, thus, also promoted accordingly.

In spite of the advantages of cloud computing, potential users (including private users up to global corporations) may be reluctant to use these services. This might, amongst other things, have the following reasons:

Data sovereignty regulations have to be respected—data have to be made accessible to state authorities upon request.

For reasons of storage space optimization by the provider, security and data protection can only be guaranteed to a limited extent.

Response times and bandwidths cannot always be guaranteed, as the provider's servers serve millions of users.

Companies offering online storage space have hundreds of thousands to millions of users who want to use the company's servers for data backups, synchronization, and file sharing.

Many online storage space providers offer their users version control systems, which means that all the different versions of a file are kept at least for a limited period of time and can be recovered by the user if necessary. As provided by law, data histories are often kept without a time limit.

Security plays a decisive role, particularly for critical data, including failure safety and the protection of data from being accessed by unauthorized third persons. In principle, state authorities are permitted to search every customer's stored data. Third parties particularly include those being authorized to access the data (such as state authorities) and unauthorized parties (such as industrial spies or hackers) who may gain access to the data.

Many service providers, thus, use their own keys for encrypting the users' data, respectively using the same key for all their customers, who, however, must not know this key. For this reason, it is required that the data have to be sent to the server in an unencrypted form via an encrypted connection. The same principle applies if the server generates an individual key for each customer or even for each file—if the server generates the key, the server, of course, knows the key and might have to make it accessible to third parties. These third parties may then obtain the data in their unencrypted form. External users who gain unauthorized access to the server, via security holes in the provider's system or by social engineering, etc., will then also be able to decrypt the data of all customers.

Current Implementations—Variant 1:

Variant 1 of the current implementations allows the user to encrypt their data on the client and to communicate them to the server already in encrypted form. Each user individually chooses a user name and a password, which is not communicated to the server. A program is executed on the users' clients (PCs, Mac books,), said program executing the following steps:

The users' data are divided into data blocks;

the program determines which data blocks have already been created and uploaded and which data blocks still have to be uploaded to the server;

data blocks which still have to be uploaded to the server are all encrypted using the same key, which is only known to the user;

a data block list listing the data blocks of the respective data and files is created;

the data block list is also encrypted using the same key known to the customer and at least changes to this list are uploaded to the server.

All the generated data are encrypted using a key generated based on the user's password and are only then uploaded to the server. For this reason, it is never necessary to communicate a password to the server.

This process can be considered as very safe, as it is based on a zero knowledge approach—the company providing the storage space does not dispose of any useful information concerning the data content on its server.

Another important aspect of this approach that the servers do not have to individually encrypt the unencrypted data blocks of the users and decrypt them again, which reduces the load on the server resources. Catering for millions of users, this allows the service provider to save a lot of resources and, thus, costs.

Compared to the current implementations according to variant 2, this approach has one big disadvantage, however: as the data blocks are encrypted by the individual users on their clients, it is not possible to determine whether data blocks created by a user have already been created by another user.

In summary, this variant offers optimal security and saves computing capacity.

Current Implementations—Variant 2:

The aim of this approach consists in an optimum use of storage space resources for filing data on the server. This is achieved by intelligent compression. A data block of any size (such as 8 kb) is replaced by a 256 bit or a smaller value, assigned unambiguously to one data block. Data blocks which are present on the server can be viewed based on their identification as dictionary-based compression. This means that a short sequence of characters may represent a very long sequence of characters, like in an index. Of course, a minimal overlay is created in the case of blocks which are only used once by a single user. But this overlay is compensated by the advantages, as this variant allows for an additional high-level compression of data blocks, which may already have been compressed.

Providers using the approach based on variant 2 may charge a user for the storage space they use, although they may only have to use significantly less storage space for this user. The version control makes it highly likely to find identical data blocks in the data of the same user, but due to the high amount of data from a high number of users, it becomes also highly likely to find identical data blocks in the data of different users—based on the principle of the birthday attack: any data block of any user may be identical to any data block of any other user. Due to the resulting high degree of compression, non-user-specific data blocks compensate the overlay of many unique data blocks. Compared to the above described variant 1, this process allows a double-digit reduction of the required storage space, which is a huge advantage for a service provider using variant 2.

The disadvantage of this variant is that it is not able to provide as much security as variant 1. In addition, this process requires the data blocks to be sent to the server in an unencrypted form and the server to encrypt these data blocks using a key only known to the service provider. Using this variant, it is not possible for the users to encrypt the data themselves, for they would have to know the general key, which would allow them to decrypt the data of all users if they gained access to the server. Variant 1 is completely different from variant 2, as one and the same data block is encrypted by a first user using the first user's key and by a second user using the second user's key. Unless the two users coincidentally have the same password, it may, thus, be excluded that one and the same data block can be recognized for several users. The server is not able to determine whether two users use the same password; for this reason, the user key should include the user name. It is only possible that two identical encrypted data blocks are two different unencrypted data blocks which become one and the same encrypted data block due to the application of the user keys—as this can be practically excluded, though, it will not be possible to achieve any compression based on identical data blocks.

Aim of the Invention:

The aim of the present invention consists in providing a process according to the second variant which still allows for a zero knowledge approach and suitably protects the customers' data from third parties—although the entire information concerning user activities and the data stored by the users can be made available to these third parties.

Another aim of the present invention consists in providing the storage space providers with an opportunity to increase their end customers' confidence by providing a process which is easy to understand and offers reliable security. This will allow end customers to overcome their reluctance to using cloud computing.

A further aim of the invention consists in providing a process which transfers many operations, particularly compressing, encrypting, and decrypting operations, to the clients, as in the above described variant 1. At the same time, the computational effort at the clients also is to be reduced, as it will be possible, based on an unencrypted block and a minimum upload to the server, to determine whether a data block is already present on the server and whether it has to be uploaded to the server in preferably compressed, but at least in encrypted form.

The invention is also intended to provide a process which will absolutely prevent any user from damaging the server by transferring manipulated data.

In summary, the inventive process is to offer the best possible protection of data against third parties under the following conditions:

a) These third parties have access to all keys of the storage space provider, know all the used algorithms and the overall process which is applied on the server.

b) These third parties may at any point in time view the information stored on the server, particularly all the data and data blocks and the data block list relating to a user applying the process. The process, thus, has to make sure that the data stored on the server are encrypted using a key which is not known to the storage space provider at any point in time or using a key which is only known to those who have saved the information concerning each and every bit of the unencrypted form of the encrypted data blocks.

c) These third parties may at any point in time view the settings and the user information of all users, particularly user names and passwords, which means that the process has to make sure that it does not become necessary to communicate the password and the user name to the server in any useable form.

d) These third parties may view a log file or a protocol chronologically containing every request made to the server, every upload, and every download as well as every change made by the users. The process, thus, has to make sure that third parties do not obtain any information if a user, for example, only changes a small section of a file and only saves this changed section on the server.

e) The process is intended to guarantee the protection of the data, although it also has to provide an opportunity for dividing data into data blocks of a fixed or variable size and for recognizing whether this data block has already been created and uploaded by the same user or by any other user. This allows the storage space provider to reduce the load on the server resources, which is very important.

f) The most important requirement is that the user password must not be stored on the server, and preferably not even the user name, but its hash value, for example, is stored on the server. It is thus possible to use the user name in combination with the user password for the generation of the user key without delivering any information to the server. The hash value of the user name on the server unambiguously identifies each user. It is, for example, possible to create a sequence of characters containing the user name, the user password, and a constant sequence of characters determined by the server and to create a hash value of this sequence to identify a user and his/her password on the server. The hash value is communicated to the server, allowing the user to log in using his/her password.

g) There are third parties trying to damage the system or to abuse the system, i.e. trying to attack the system. The process should be immune against such attacks to the greatest possible extent.

In this connection, the present invention provides for the following steps to be carried out for each unencrypted data block on the client in order to determine the data blocks and the data block list to be uploaded to the central server:

Alternative 1 (as Described in the Unpublished Patent Application PCT/AT 2011/000216)

generating a data block key using a key generation rule which uses the unencrypted data block as an integral component for generating said data block key;

encrypting the unencrypted data block using the generated data block key to create an encrypted data block based on an encryption rule;

generating a unique data block ID value based on the unencrypted data block and, optionally, based on the key generation and/or the encryption rule and assigning of this data block ID value to the encrypted data block using a data block ID generation rule predetermined for each user in a data block ID value generating step, communicating this unique data block ID value from the client to the central server in a data block ID value communication step in order to receive a response from the server as to whether the encrypted data block assigned to this data block ID value has to be uploaded to the server, and, based on this response, uploading at least parts of the encrypted data block or not;

saving said unique data block ID value in the data block list, which is to be uploaded to the server;

saving the said unique data block ID value and the data block key in a list of data block keys, unless data block ID value is already part of said list of data block keys;

and for carrying out the following steps after having completed the above steps for each unencrypted data block:

encrypting the data block list using a key for lists of data and data blocks, said key being generated based on a data block list key rule, said rule being managed by and only known to the user;

encrypting the list of data block keys using the user key;

uploading the encrypted data block list and the encrypted list of data block keys from the client to the central server;

the unencrypted data blocks, the unencrypted data block list, the unencrypted list of data block keys and the generated data block keys and the user key remaining exclusively on the client;

and, in the data recovery step, the server sending the data which are stored on the server in their encrypted form, the server being not able to decrypt them, to the client, so that data recovery is only carried out on the client.

The sequence of the above mentioned steps is not subject to any limitation and any possible option may be chosen freely.

Alternative 2 (Invention as Claimed)

A file key is generated based on a key generation rule which uses the unencrypted file which consists of at least one data block as an integral component for the generation of the file key.

The following steps are carried out for each unencrypted data block on the client in order to determine which data blocks and which lists of data and data blocks have to be uploaded to the central server:

encrypting an unencrypted data block using the generated file key to obtain an encrypted data block, using a predefined encryption rule;

generating a unique data block ID value based on the encrypted data block based on a method known to the server and assigning of this data block ID value to the encrypted data block using a data block ID generation rule predetermined for each user in a data block ID value generating step, communicating this unique data block ID value from the client to the central server in a data block ID value communication step in order to receive a response from the server as to whether the encrypted data block assigned to this data block ID value has to be uploaded to the server, and, based on this response, uploading at least parts of the encrypted data block or information generated therefrom or not;

saving said unique data block ID value in the data block list, which is to be uploaded to the server;

and carrying out the following steps after having completed the above steps for each unencrypted data block:

encrypting the list of data blocks using the file key;

generating a unique data block list ID value from the encrypted list of data blocks and assigning said value to the encrypted list of data blocks;

encrypting the data block list ID value using the user key, which is generated based on a data block list ID value key rule, said rule being managed by and only known to the user;

encrypting the file key using the user key, which is generated based on a data block list ID value key rule, said rule being managed by and only known to the user;

uploading the encrypted list of data blocks and the encrypted ID value of the list of data blocks as well as the encrypted file key from the client to the central server and assigning the encrypted file key to the encrypted data block ID value;

the unencrypted data blocks, the unencrypted data block list, the unencrypted file keys, the data block list ID value and the generated data block keys and the user key remaining exclusively on the client;

and, in the data recovery step, the server sending the data which are stored on the server in their encrypted form, the server being not able to decrypt them, to the client, so that data recovery can only be carried out on the client.

The following applies to both alternatives 1 and 2:

BRIEF DESCRIPTION OF THE DRAWINGS

The process of the invention and its advantages will be discussed in detail referring to exemplary embodiments below.

DETAILED DESCRIPTION

Figure 1:
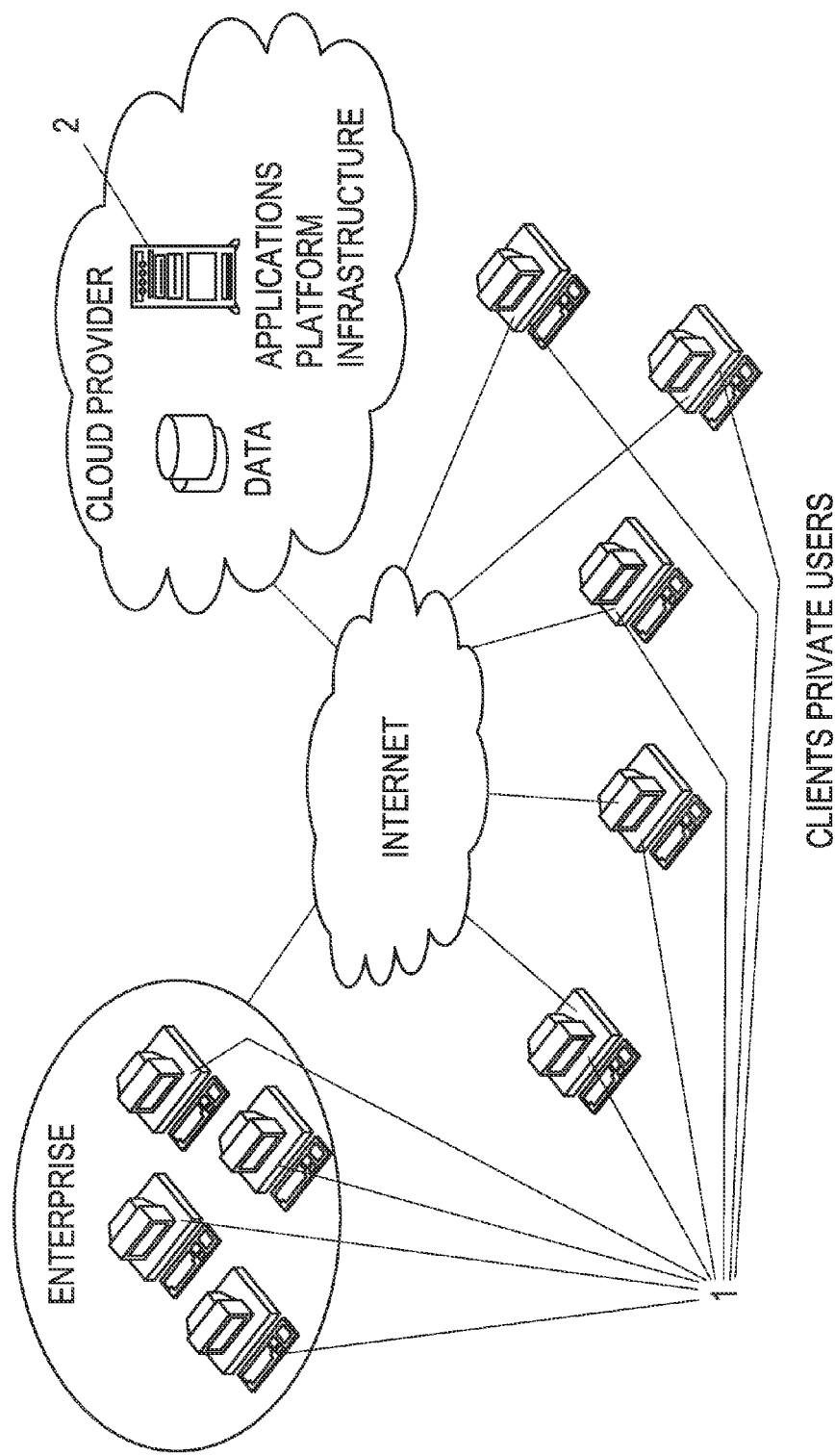
In FIG. 1 an embodiment of the invention is shown based on a configuration of a central server and users or clients.

This disclosure describes a process for storing data on a central server. This disclosure describes numerous specific details in order to provide a thorough understanding of the present invention. One skilled in the art will appreciate that one may practice the present invention without these specific details. Additionally, this disclosure does not describe some well known items in detail in order not to obscure the present invention.

An interaction between a server 2 and a client 1 is required for the implementation of the described process.

In one embodiment, the server stores the data blocks in database tables; in another embodiment the data blocks are stored in files, the data block ID value being used as file name, for example. The latter solution, however, is not to be preferred due to the expectedly high number of data blocks.

It is not relevant for the process which algorithm is used for encrypting the data blocks, as long as the algorithm supports block feedbacks and is sufficiently secure and performant. AES is a preferred encryption algorithm, as has been very thoroughly analyzed and has, thus, become the standard algorithm applied in this area.

Any highly performant algorithm supplying sufficiently long and unique hash values may be used for calculating hash values. In this case, one of the SHA-2 finalists is to be preferred, as they are offer a higher degree of security and are more performant than SHA-2.

This process uses a key for encryption which is only known to the respective user. The key preferably consists of the hash value of the user name and the user password, but may also be generated by any other process for generating a key which is only known to the user. This key will be referred to as user key below.

Alternative 1

In addition, the process generates a key for each unencrypted data block, said key being based at least on the unencrypted data block. This key will be referred to as data block key below and makes sure that it will only be possible to decrypt individual data blocks, if the respective user has already known the data block in its unencrypted form. On the one hand, this allows for the encrypted data blocks to be made publicly available and for determining which data blocks have already been created and uploaded by any user. At the same time, it becomes practically impossible for third parties to determine the contents of specific data blocks, as the data block itself does not contain any information concerning the key.

The data block list and the list of data block keys are also encrypted for security reasons. These two lists are encrypted using the user key, as they must not be known to third parties. It is thus easy for the users to identify the data blocks they need in order to recover a specific file and to retrieve those data blocks from the server. The user identifies the data blocks based on the information contained in the data block list. To be able to decrypt the individual encrypted data blocks, the user obtains the required key from the list of data block keys and uses each key for the respective data block.

As both encryption and decryption take place on the client and not on the server, the server does not have to be informed about any of the used keys, neither about the user key nor about the data block key, at any point in time.

If the encrypted data blocks are stored on the server in a database, as in one possible embodiment of the invention, the database preferably contains at least the following tables and columns:

Table "Encrypted Data Blocks":
Column: encrypted data block
Column: 256 bit hash of the encrypted data block (Primary key—this column may be calculated automatically per trigger, which prevents any manipulation by third parties, for example by uploading wrong data. It is also possible to set an index to a function, such as SHA256 (encrypted data block), dropping 256 bit for the column itself.)

Table "Encrypted Lists of Users and Files":

Column: identifier for users (indexed with the hash value of the file name, preferably an ID value linking to a table containing the hash values of user name, password, and character sequence)

Column: hash of the file name (indexed with the user identifier, optimally encrypted using the user key, as the user encrypts the file name on the client and is thus able to find it on the server using the index; if the file name is encrypted using a provider key, data protection against third parties can no longer be guaranteed).

Column: file name (optimally encrypted, completely in combination with the directory path)

Column: list of data block ID values (encrypted using the user key)

Column: reference to the file version (preferably the upload date; a file of the latest version can thus be identified based on the date—only needed if the offer includes a version control system).

Column: file hash (allowing for verifying quickly whether a file was changed and whether the file was restored correctly).

Table "List of Data Block Keys":
Column: user identifier
Column: data block ID value (indexed, encrypted using user key)
Column: data block key (encrypted using user key)
Table "User":
Column: unique user password
Column: user access data (indexed, including hash values of user name, password, sequence of characters—linked to the table "Encrypted Lists of Users and Files")
Columns: further user information (last name, first name, available storage space, . . . —preferably encrypted using a key which is only known to the server and its provider).

We want to stress again that the above embodiment is just one of many possible embodiments. This embodiment offers the following advantages:

1. Data are not stored redundantly, which means that only a minimum storage space is used.

Data are stored in a form which makes them particularly useful for further developments and other embodiments of the present invention, as will be shown below.

3. The load on the server resources is limited to responding to SQL requests and entering data in tables. The server does not have to buffer user data, as the "User" table can be linked to the "Encrypted List of Users and Files" using an SQL JOIN request.

An alternative embodiment for a data model on the server consists in an expansion of the "Encrypted User Files Lists" by a column containing "data block keys", making the table "List of Data Block Keys" superfluous. This embodiment offers minimal advantages, as the two tables do not have to be linked by a JOIN predicate via the data block ID value. A disadvantage is that the amount of data to be stored and the data transfer between client and server increase dramatically. If the column "list of data block ID values" is compressed, does not offer any advantage in any further embodiment.

In another alternative embodiment, the column "list of data block ID values" in the table "Encrypted Lists of Users and Files" may be stored as one data set per data block ID value of a file instead of as a list of binary character sequences. This embodiment does not offer any advantages, either, but has some disadvantages.

Those of skill in the art know further options whose advantages and disadvantages have to be considered in relation to the respective requirements in order to be able to select the optimum data model for each specific case.

If the file name is stored in a different encrypted form each time it is used, preferably using an input vector, the hash of he unencrypted file name may also be entered in an additional column in order to allow the server's version control system to work without knowing the key. The same principle should be applied to as many columns of as many tables as possible.

This means that the entire information on the server relating to a file is completely encrypted and cannot be used by anybody except for the user who has created the respective file.

Every user has a user name and a password. The password is not stored in the cloud, and, optimally, the user name is not stored in the cloud, either. In one embodiment, a 256 bit hash of the following information may be stored on the server: user name plus user password plus a constant sequence of characters. This allows for an unambiguous identification of users and their passwords in order to supply a register and file list for each user.

In order to retrieve encrypted data blocks which are stored on the server in the form of unencrypted data and files on the user's client, the following steps are executed on the client, preferably in this order:

1. retrieving from the server the encrypted list of data blocks and files for the respective file;
2. decrypting the list of data blocks and data using the user key;
3. retrieving from the server the data blocks contained in the list based on the data block ID values from the decrypted list of data blocks and data;
4. retrieving from the server the encrypted list of data block keys and decrypting said list using the user key;
5. decrypting encrypted data blocks using the respective data block keys from the list of data block keys;
6. combining the unencrypted data blocks and saving them under the desired file name in the main memory or on the hard disk.

Alternative 2

In contrast to alternative 1 the existing file constitutes the basis of the key generation rule. In a first step the file will be divided into data blocks.

In addition, this process generates a key for each unencrypted file, said key being obtained at least using the unencrypted file. This key is then referred to as file key and makes sure that individual files can only be correctly decrypted if the respective user already knows or has already known before what the file looks like in its unencrypted form. On the one hand, this allows for making encrypted files publicly available and determining whether a file has already been created and uploaded by any user. At the same time, it becomes practically impossible for third parties to determine the contents of specific files, as they do not contain any information concerning the respective keys.

The data block list and the list of data block keys are also encrypted for security reasons. These two lists are encrypted using the user key, as they must not be known to third parties. It is thus easy for the users to identify the data blocks they need in order to recover a specific file and to retrieve those data blocks from the server. The user identifies the data blocks based on the information contained in the data block list. To be able to decrypt the individual encrypted data blocks, the user obtains the required key from the list of data block keys and uses each key for the respective data block.

As both encryption and decryption take place on the client and not on the server, the server does not have to be informed about any of the used keys, neither about the user key nor about the data block key, at any point in time.

If the encrypted data blocks are stored on the server in a database, as in one possible embodiment of the invention, the database preferably contains at least the following tables and columns:

Table "Encrypted Data Blocks":

Column: encrypted data block=data block ID

Column: 256 bit hash of the encrypted data block (Primary key—this column may be calculated automatically per trigger, which prevents any manipulation by third parties, for example by uploading wrong data. It is also possible to set an index to a function, such as SHA256 (encrypted data block), dropping 256 bit for the column itself.)

Table "File Structure List"

Column: file ID (value calculated/generated based on the file, such as the hash value of the encrypted first and last blocks. Preferably, it is the hash of the list of data blocks, however, as this value can also be calculated by the server).

Column: list of data blocks (sequence of encrypted data block hash values).

Table "Encrypted Lists of Users and Files":

Column: identifier for users (indexed with the hash value of the file name, preferably an ID value linking to a table containing the hash values of user name, password, and character sequence)

Column: hash of the file name (indexed with the user identifier, optimally encrypted using the user key, as the user encrypts the file name on the client and is thus able to find it on the server using the index; if the file name is encrypted using a provider key, data protection against third parties can no longer be guaranteed).

Column: file name (optimally encrypted, completely in combination with the directory path)

Column: file ID (encrypted using the user key)

Column: file key (encrypted using the user key)

Column: reference to the file version (preferably the upload date; a file of the latest version can thus be identified based on the date—only needed if the offer includes a version control system).

Column: file hash (allowing for verifying quickly whether a file was changed and whether the file was restored correctly).

Table "User":

Column: user access data (indexed, including hash values of user name, password, sequence of characters—linked to the table "Encrypted Lists of Users and Files")

Columns: further user information (last name, first name, available storage space, . . . —preferably encrypted using a key which is only known to the server and its provider).

We want to stress again that the above embodiment is just one of many possible embodiments. This embodiment offers the following advantages:

1. Data are not stored redundantly, which means that only a minimum storage space is used.

2. Data are stored in a form which makes them particularly useful for further developments and other embodiments of the present invention, as will be shown below.

3. The load on the server resources is limited to responding to SQL requests and entering data in tables. The server does not have to buffer user data, as the "User" table can be linked to the "Encrypted List of Users and Files" using an SQL JOIN request).

Figure 2:
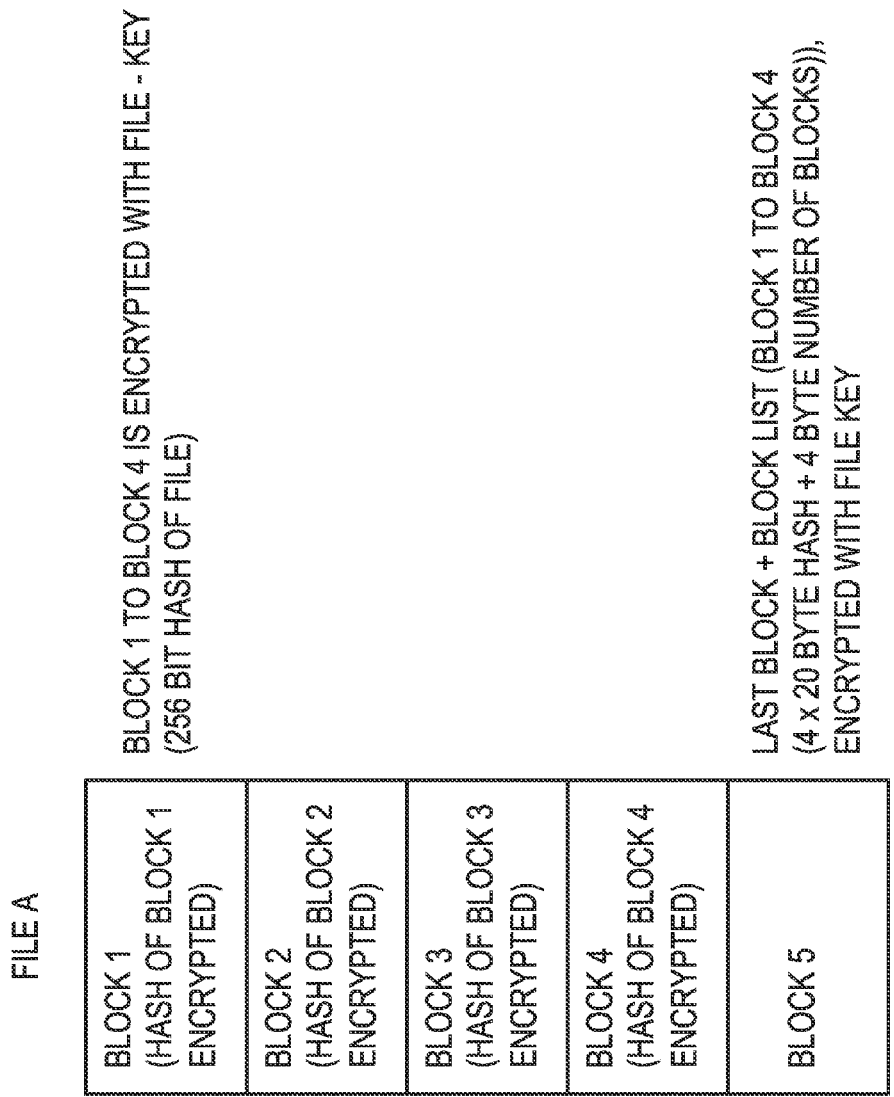
In FIG. 2 a file encryption example according to another embodiment of the invention is shown.

An alternative embodiment for a data model on the server consists in adding the list of data blocks, i.e. the hash values of the individual blocks of which one file consists, to the last data block (see FIG. 2). This information can preferably be added to the end of the last block, and the last 4 bytes state the overall number of data blocks. In this embodiment, the "data structure list" is not required and the overlay is further reduced. The client saves the data block ID value of the last data block, said last data block no longer being required to be included in the list of data blocks. In addition, it is no longer possible for third parties to see the number of blocks of which one file consists and, thus, they cannot make any estimations concerning the file size any more.

Those of skill in the art know further options whose advantages and disadvantages have to be considered in relation to the respective requirements in order to be able to select the optimum data model for each specific case.

If the file name is stored in a different encrypted form each time it is used, preferably using an input vector, the hash of he unencrypted file name may also be entered in an additional column in order to allow the server's version control system to work without knowing the key. The same principle should be applied to as many columns of as many tables as possible.

This means that the entire information on the server relating to a file is completely encrypted and cannot be used by anybody except for the user who has created the respective file.

Every user has a user name and a password. The password is not stored in the cloud, and, optimally, the user name is not stored in the cloud, either. In one embodiment, a 256 bit hash of the following information may be stored on the server: user name plus user password plus a constant sequence of characters. This allows for an unambiguous identification of users and their passwords in order to supply a register and file list for each user.

In order to retrieve encrypted data blocks which are stored on the server in the form of unencrypted data and files on the user's client, the following steps are executed on the client, preferably in this order:

1. retrieving from the server the encrypted the encrypted file key and the encrypted data block list ID value;

2. decrypting the file key and the data block list ID value using the user key;

3. retrieving from the server the encrypted list of data blocks assigned to the decrypted data block list ID value;

4. retrieving from the server the data blocks from this list based on the data block ID values from the decrypted list of data blocks and files;

5. decrypting the encrypted data blocks using the respective file key;

6. combining the unencrypted data blocks and saving them under the desired file name in the main memory or on the hard disk.

If the list of data blocks is added to the last block, the user saves the block ID value of said last block.

The data block size may be either predefined for each data block or is, for example, computed based on the hash of the file key or a portion thereof, which means that, on the server, only random data block sizes can be identified and it becomes impossible to identify the end of a file.

If a data block which the client wants to upload to the server is present thereon, the server requests from the client the hash of the encrypted data block in combination with an item of information which must only be known by the client and the server, in order to verify that the client possesses said data block, without said data block being uploaded; this solves the so called "dropship" problem. The item of information may, for example, be a credit card number.

The Following Applies to Both Alternatives 1 and 2:

If the users want to change their passwords after having already stored data on the server, one embodiment preserves the first password, which is then encrypted using the new password. Alternatively, the data block list and the list of data block keys can be newly encrypted.

The encrypted data blocks themselves do not have to be newly encrypted, as each data block has its own key.

In one embodiment each data block list which was once retrieved from the server or established directly on the client is preserved on the client; the same holds true for the list of data block keys. Thus, there is no round-trip cycle to the server. If the files of a user are processed and synchronized on different clients, only those entries of the data block list which are missing or were changed are retrieved from the server. The list is, thus, only complemented or changed to include those entries which were changed on other clients.

If a data block was changed on a client, another client can easily detect the changes by synchronizing the data block list with the server. The total file hash value and the total data hash value may also be used to easily determine whether a file was changed and has to be divided into data blocks.

In one embodiment the hash value of the encrypted data block list is sent to the server to determine directly if any file was changed. It is also possible to store the hash of a complete unencrypted file, which may be slightly modified, on the server, so that changes of a file can be quickly identified, even before a file has been divided into data blocks. The table "Data Block List" is thus expanded by a column containing the described hash value of the unencrypted file. This hash value may be stored on the server in both an encrypted and an unencrypted form, as the value does not provide any useful information. If the hash value is not encrypted, the client can send a direct request to the server by uploading the hash value; if the hash value is encrypted, the encrypted hash value has to be uploaded to the client first and to be decrypted by the client.

Nevertheless, the encryption of this hash value offers the advantage that if the file is restored by third parties—for example, if they correctly guess the individual data block key or if they try to create an identical file—it cannot be verified if this file exactly corresponds to the file which was really stored by the user.

In one embodiment, those of skill in the art will only upload those entries of the data block list and the list of data block keys to the server which have been determined to have been changed.

In one embodiment the entire encrypted data block is uploaded to the server in order to verify whether it is already present on the server; if this is not the case, it may be directly stored on the server. In this case, the data block ID value would be identical to the encrypted data block. This embodiment, however, is only mentioned for the sake of completeness and should not be applied practice.

The hash information pertaining to client and data blocks containing the hash value of the unencrypted data block should only be stored on the client and be executed on each client independently from the other clients. The information may be determined on the client when uploading unencrypted data blocks and when downloading and subsequently decrypting encrypted data blocks.

This has the following advantages:

The server does not have to store the client data block hash information for each data block of each user, using less storage space on the server.

Based on the unencrypted data blocks the client can already determine whether the user has created a new data block, without sending a request to the server and without first having to compress and encrypt the unencrypted data block. This means that the client's performance can be enhanced and the number of uploads to and downloads from the server is reduced.

The server should only use a value as data block ID value which it is able to trace and to create, such as a secure hash value of the encrypted data block. If the server used information which is not traceable for the server itself, it would have to trust the users—and it is possible that some users might deliberately assign encrypted data blocks to wrong data block information, which may have repercussions on several users, as other users requesting the wrongly assigned data blocks on the basis of the supposedly correct data block ID value, may receive wrong data blocks, their data, thus, becoming destroyed.

In one embodiment, the client itself keeps a list of client-related data block ID values, preferably as an extension of the list of data block keys. The server would thus only reply whether a data block is already known or not, and the client would include each data block in its list of data block keys and generate a specific, serial client-related data block ID value for each data block ID value.

This embodiment has the advantage that the data block list includes shorter data block ID values for each data block of each file, as each individual client has fewer data blocks than the server. In this embodiment a 64 bit data block ID value, which can be very well compressed, is sufficient. In addition it is possible that a file, which consists of a high number of data blocks, can store that it combines the successive data blocks five to fifty, for example, in this order, without individually listing the data block ID values, which allows for saving storage space on the server.

If the user remembers shorter data block ID values and the server does not number data block ID values consecutively and, thus, data blocks cannot be requested based on these serial data block ID values, this has the advantage that it is not possible to incidentally find and request data block ID values from the server by requesting serial ID values.

In the past, there were abuses of requests of data block ID values from the server to determine, whether a user has to upload a certain file or not: due to the hash value, the server assumed that the user already had the file at his/her disposition and created the respective assignment. Of course, the user could then immediately download the file again, as she/he already had the file at his/her disposition.

Thus, hackers had the idea to distribute the hash values of files in forums and create a new type of file-sharing, comparable to torrent networks. It is possible to prevent this by making sure that the client still has to upload the overall file, although the server already knows the file or the data block. This way, it can be made sure that the user really has the file at his/her disposition, and the file-sharing sites become pointless. The server stores the data block only if it finds out that the respective data block has not already been stored.

Alternatively, it would also be possible that the server makes the client divide a data block into four parts and wants to know two of these four parts. The division may be random or traceable, based on the user data. This has the advantage that the upload of data is reduced by 50% and that the user has to know at least 50% of a file, not knowing in advance which 50% the server will want to know.

In another embodiment the server delivers an unambiguous ID value for each compressed, encrypted data block when finding and newly creating such data blocks. In this case, a new, indexed column of the ID values would be required for Table 1, the block ID is entered into the table instead of the HASH.

This has the advantage that the user does not need 256 bit per block any more, but only 64 bit or a maximum of 128 bit. The additional storage costs for Table 1 are offset as soon as one block is found three times or more often (file versions).

Any manipulation by external users can again be excluded, as the ID values are only generated on the server and only sent to the client upon request.

It is assumed that, due to the high number of data blocks stored on the server, at least a 256 bit hash value will be required to unambiguously identify a specific data block. In many cases, 128 bit will still be sufficient. This can be used for an embodiment in which the client only communicates the first 128 bit of the data block ID value to the server and the server supplies the remaining 128 bit values of all data blocks starting with the first 128 bits of the request in the form of a list.

If the server does not find any data block matching the first 128 bit, it returns the value 0 or another characteristic value.

In one embodiment the server only stores those data blocks which were at least once requested using at least 128 bit of their hash values. This makes it a little more difficult for third parties to spam the server with useless data, as they would also have to calculate the hash value for each useless data block that they want to store on the server.

In one embodiment the blocks are not requested from the server in the determined order in which they occur, but in a random or sorted order.

This requires more storage space on the client (as the blocks have to be preserved until they have each been completed individually), but better disguises the structure of a file—as it is not known in which order the blocks are combined in the file.

In another embodiment (which is known according to the state of the art), the client locally stores all the blocks which it has ever generated or which it knows from elsewhere (for example in an SQLite data base). This makes round-trips to the server unnecessary, and even less information is made available.

In another embodiment, the first x bit (for example the first 128 bit) of each block are left out and only entered in the list of data blocks.

In connection with the ID values of the hash blocks, it is useful to compress the list of data blocks (as it does not only contain hash values).

This requires additional x bit of storage space for each file block of a user (can be reduced by means of compression).

(Overlay: 16 bytes more in compressed state, fewer bytes for the block, slightly increases the probability of finding the right block among a number of identical blocks practically 0 . . . )

This has the following advantages:

1. The compressed, encrypted blocks are reduced in size by a few bytes, which makes it more likely that IDENTICAL blocks of the same user or among several users can be identified.

2. If a block is already known in its unencrypted form (as it is known as a source text), there are still 16 bytes per block about which no information is available, as these 16 bytes are encrypted using the user key . . . .

This means that in the case of a 1 MB file and 16 kB blocks 16*64 bytes=1 kB are completely unknown (0.1% of the overall file)—it will thus never be possible to be 100% sure that it was EXACTLY one specific file that was used.

In another embodiment it is not always the first 16 bytes which are eliminated from each block, but any position of 256 (or another number of) possible positions from the 16384 bytes (16 kB) (1 byte for the position at which the bytes were removed—each time determined by a random generator).

Advantage: removing any positions and storing separately have the significant advantage that nobody knows from which positions the bytes have been removed.

Disadvantage: up to 1 byte more storage space per data block (as the data blocks are compressed), which reduces the likelihood of finding identical blocks, as the source blocks can be divided in up to 256 (or another number of) different ways.

Based on the various options, those of skill in the art have further embodiments and improvements at their disposition, not all of them being discussed herein.

It is recommended that not even the user name is stored on the server, but only the user name's hash value.

It is, for example, possible to use a variation of the PKCS #5 process, which is known according to the state of the art in connection with generating secure passwords, for claim 4.

This has the advantage that instead of 256 bit only 128 bit data block keys have to be stored as key basis information for each data block of each user. In order to make the shorter 128 bit keys as secure as 256 bit keys, the conversion to 256 bit is deliberately decelerated, making brute force attacks and other cryptographic attacks on the 128 bit key basis information more difficult, as there will be a deliberate delay for each individual attempt.

A run length encoding is applied to the data block in order to obtain a run length encoded data block and a predetermined number of characters is removed from a predetermined position of said run length encoded data block and said removed characters are added as additional information to each data block in the list of data blocks.

The data block key or the key basis information is generated by a one-way function from the pre-sorted data block and/or from the run length encoded data block.

The key generation rule can be selected by each user from a predeterminable number of key generation rules. The encryption rule can be selected by each user from a predeterminable number of key encryption rules.

The client may keep a list of the hash values of its unencrypted data blocks, so that, after having changed a file, it will be possible determine faster whether a corresponding data block as to be newly created or whether this data block already exists. The advantage of using the unencrypted data block as a basis for recognition consists in making the steps of compressing and encrypting unnecessary to obtain the hash value of the compressed data block, based on which the synchronization with the server takes place. It also significantly reduces the number of requests to the server, reducing the number of uploads and downloads. Storing this list on the server does not offer any advantage—on the contrary, the server uses more storage space for each data block key of each user.

A preferred embodiment consists in overlaying the data block list with an input vector before its encryption. This input vector may be publicly known, but should be different for each data block list, also for each of the different lists of one user. If the data block list is a table and the individual entries of the data block list are stored in the form of text in a column, the hash of the data set ID or the hash of the precise date of the creation of the data set can be used as input vector.

The significant advantage of these input vectors becomes mainly clear in connection with file histories. If a file is only changed at its end, the data blocks at the beginning of the file remain unchanged, which means that it would become evident from the data block list at which position the file was changed first. Even though this kind of information is not very useful for third parties anyway, it can easily be hidden by using the input vector and block feedbacks (such as CBF, CBC, etc.).

This embodiment can also be used with unencrypted data blocks to maximize security in this area.

The service provider should only definitely store data blocks for which a hash value (or a portion of the hash value) has been previously requested.

This makes it extremely difficult for third parties to upload useless data blocks to the server, as they would have to generate these data blocks first, to generate and then request the hash of each data block afterwards, and would only then be able to upload the respective blocks.

It is still possible for third parties to upload unencrypted data blocks to the server in order to avoid the steps of compressing and encrypting, thus being able to upload "data clutter" faster.

Below you can find a brief summary of possible cases of fraud and solutions helping to avoid them:

Data Block Size Fraud:

It is possible to subdivide the unencrypted file into data blocks, which are then individually compressed and encrypted.

The data blocks to be uploaded to the server do not have the same size due to different compression rates, and the server cannot determine the actual original size of the data blocks.

This allows data block size fraud to compress data blocks which are larger than the predetermined data block size (e.g. 8 kB) to a value slightly below the data block size.

A data block sized 16 kB is compressed to 7.9 kB, for example, as if it was an 8 kB data block compressed to 7.9 kB more storage space than paid for (average maximum gains in storage space of 30%).

One possible solution would consist in first compressing the unencrypted file and then subdividing it into data blocks which would encrypted afterwards.

Each data block to be uploaded to the server, optionally except for the last data block, thus has the same size as the other data blocks, making cheating much more difficult, if it was not for the following option:

Data block size fraud compresses larger data blocks to a size smaller than the data block size (e.g. from 16 kB to 7.9 kB) and fills the remaining bytes to achieve the precisely predefined data block size (e.g. 8 kB) with blank characters, for example. The system is not able to identify the cheat.

A disadvantage of this possible solution consists in the fact that it makes a de-duplication of data blocks highly unlikely, as a change at the beginning of a file is continued to the file's end by compression.

File Size Fraud:

According to the process, the server is not able to obtain information concerning the files of its users. The data block list is preferably compressed and then encrypted and, thus, does not contain any useful information concerning the number of data blocks forming a file.

The server, thus, has to rely on the users to communicate the correct file sizes to the server for calculating the respective amount due for the storage space.

File size cheaters communicate smaller to significantly smaller file sizes to the server.

This problem could be solved by allowing a user only to download as many different data blocks as they have specified and, thus, paid for.

A cheater has a file of 100 MB, for example, and cheats and claims that the file only has 1 MB; the user would then only be allowed to download data blocks of an overall size of 1 MB.

In this case, an overlay, i.e. a certain tolerance, would be required; the user may be allowed to download 2 MB instead of 1 MB.

This, however, does not prevent cases in which a data block is part of different files of one and the same user, for the user (cheater) would only have to specify and download this data block only once.

> Misuse can, however, be significantly limited.

It also makes it impossible for cheaters to state that they have exactly one file. In this file, the users then save both their private list of data block keys and their private lists of data and data blocks which were previously generated on the client and optionally deleted from the server immediately afterwards. Without the above limitation, such a user could obtain practically limitless storage space.

Such a cheater would, on the other hand, infringe the patent (Open Source would not be possible, either).

Spyware

Spyware does not only monitor all the data stored on the server by a user, but also remembers from the protocol which data blocks were up- and downloaded by a specific user.

Spyware can thus identify the encrypted data blocks which are part of a certain file.

A variation consists in sending or requesting the data blocks in a random sequence. This makes it more difficult for spyware, as the exact sequence of the data blocks of which a specific file is composed remains unknown. DMCA can still be enforced, if a file to be traced is known.

Although the client needs a little more memory capacity, which may, of course, be transferred to the hard disk, for example in and SQLite database, this variation should still be applied in all cases.

An additional variation consists in making the user cut off a certain constant number of bytes from the beginning of every data block and saves these bytes for each data block in an encrypted form in the data block list. Particularly in relation to the DMCA, certain parts of the definitive file of the user remain unknown to the spyware it cannot be assumed that a user uses exactly the file traced by the DMCA. A slight disadvantage consists in small additional storage space requirements for the data block list of 16 bytes per data block, for example, said 16 bytes being, however, compressible in some cases. Based on a block size of 16 kB, this results in an overlay of 0.1%, and only 0.1% of a file are only known to each individual user him-/herself, which also means that only 0.1% of the information contained in each file are missing. The data blocks are a little reduced in size, which increases the likelihood of finding identical data blocks, at least to a minimum extent, and an identified identical data block, just differing by the first 16 bytes, offsets the overlay of 0.1% of many data blocks which is due to the resulting high compression rate.

Another additional variation consists in subdividing each data block of a file into a specified number of data sub-blocks and in joining these data sub-blocks in a sorted order one after the other. The data sub-blocks do not necessarily to be sorted according to a binary basis and may, thus, for example also be sorted in a descending order or according to any algorithm, which is specifically predetermined for all uses or at least of a predetermined number of users assigned to user groups.

EXAMPLE

For reasons of simplicity, a data block in the following example consists of 20 characters, while each of the data sub-blocks consists of 4 characters.

The following data block is given, the blank characters representing the subdivision of the data block into data sub-blocks:

Data Block Subdivided into Data Sub-Blocks: DDDD AAAA CCCC BBBB ABAB

Further Data Block Subdivided into Data Sub-Blocks: CCCC ABAB BBBB DDDD AAAA

Data Block after Having Sorted its Data Sub-Blocks: AAAA ABAB BBBB CCCC DDDD

One byte which may be looked up in a global list or in a list compiled by the user and based on which this sequence may be computed is sufficient to guarantee 256 different combinations.

The value 0 would signify: use the sequence the way it is.

The value 1 would signify: starting with the second data sub-block, followed by the first data sub-block, after which the sequence remains unchanged.

The value 2 would signify: starting with the third data sub-block, followed by the first data sub-block, followed by the second data sub-block, the further sequence remaining unchanged.

etc. until reaching the value 255 . . . .

It becomes thus impossible for spyware to identify the sequence in which the data sub-blocks are to be reassembled, as it perceives the sorted data block as an uncompressed one-way function.

This step may be carried out based on an uncompressed and based on a compressed or encrypted data block. Using an encrypted data block as a basis does not offer any advantage compared to the application of this step using the compressed data block, and is thus only mentioned for the sake of completeness.

If data blocks are subdivided based on their compressed form, this offers the advantage that the size of data blocks may have been significantly reduced; subdividing uncompressed data blocks, on the other hand, has the advantage that the pre-sorted data at least theoretically allows for a better compression.

It is left to the discretion of those of skill in the art whether they carry out the step of subdividing the data blocks based on compressed or uncompressed data blocks.

Those of skill in the art can also decide whether they want to sort the data sub-blocks or merge them randomly. Merging them randomly has the advantage that the data sub-blocks do not have to be sorted on the client. In practice, sorting the data sub-blocks does not require much of an additional effort, as it makes sense to use a small block size. The disadvantage of merging data sub-blocks randomly consists in the reduction of data block de-duplication, as identical data blocks are merged differently and the users use different processes for merging them.

It is preferable to use a compression process which uses a reversible transformation, such as the Burrows-Wheeler transform and move-to-front coding, as a first step. Instead of adding the identified line index as additional information to the thus transformed data block, i.e. adding the line index at the end of the data block, for example, and then carrying out the actual compression using RLE (run-length encoding) and Huffman/AC (arithmetic coding), it is possible not to store the line index at the data block, which is encrypted later on, but to add it at the end of each data block ID value in the data block list.

This requires additional six bits in case of a data block size of 16 kB, and additional eight bits in case of a data block size of 64 kB.

The overlay is minimal, but the spyware only knows that the data block downloaded by the user corresponds to one of 16,384 options (data block size of 16 kB) or of 65,536 options (data block size of 64 kB), while the user can distinctly identify the desired option.

A very important advantage of this adapted Burrows-Wheeler-variant is that it is not necessary to perform any additional step on the client.

As has already been mentioned, this increases the likelihood of identifying identical data blocks, and, as one file consists of a high number of data blocks, spyware cannot prove that a user has saved or loaded exactly one particular file, although the spyware may know which data blocks were downloaded by the user for a file in any sequence. For a file of 3 MB, which is subdivided into 192 data blocks, there are 16,384×192 options for decompression, i.e. 3,145,728 options, (not taking into account the random sequence in which data blocks are requested), and it is impossible to know which option is used by a user.

In one embodiment the constant sequence of characters is removed from a data block which has already been transformed according to Burrows-Wheeler, allowing for a better compression of these removed characters, which are then added to the data block list—on the other hand, this also makes it easier to find out exactly which characters were removed by the client. This could be avoided by applying RLE first and removing the first five thus encoded characters and their number, for example. This means that the client saves 15 bytes per data block in its data block list—if data block sizes ranging from 8 to 64 kB are to be used, one character can only occur between 1 and 65,536 times. Only the ASCII key of the removed character (1 byte) and the number of times it occurs (2 bytes) are saved.

It is possible to predefine a Burrows-Wheeler variation for all users or for groups of users, said variation sorting the transformed list not according to ASCII characters in an ascending order, but according to the statistically most frequent ASCII characters, as a significant part of characters may be removed from the data blocks: both the character and the information concerning the number of its occurrences are removed.

If a Burrows-Wheeler transform is applied, the data block key or the key basis information should be applied to the pre-sorted data block. A further variation consists in using the run-length encoded data block as a basis for the data block key of the key basis information.

This allows for a de-duplication of different data blocks having identical Burrow-Wheeler encodings, as the data block keys of these data blocks are the same. This variation allows for security in relation to the DMCA, for example, as the request of a data block leaves open many options for decoding a data-block, due to the missing first five characters and the number of their occurrences in the respective data block as well as due to the missing list index key.

This embodiment should preferably be used, as it additionally allows for the de-duplication of data blocks.

The above described principle may applied in the form of data block templates, the key for completing the templates to obtain the desired data block remaining exclusively with the user and being assigned to the corresponding data block in the data block list.

The described principle of data block templates may, for example, also be applied using a variation of the compression algorithm SEQUITUR, as, in this case, a dictionary is compiled as additional information, at least parts of this additional information not being assigned to the data block, which allows for a wide variety of possible data block de-compressions.

A check hash for the overall file in order to verify if file recovery has been successful or if a file was changed, should be saved on the server in an encrypted form using the user key, as a guard against spyware and particularly against DMCA.

Following appendices contain illustrative examples without limiting the scope of the invention:

Sequence of actions for communicating data to the server
Description of the steps of the excel files of alternative 2, the invention as claimed
Steps alternative 2, new file (invention as claimed)
Steps alternative 2, file existing and will be deduplicated (invention as claimed)
alternative 2, example of data storage on server and client (invention as claimed)

Other embodiments of the present invention will be apparent to those skilled in the art after considering this disclosure or practicing the disclosed invention. The specification and examples above are exemplary only, with the true scope of the present invention being determined by the following claims.

APPENDIX A

Sequence of Actions for Communicating Data to the Server

| | Sequence of actions for communicating data to the server only valid for alternative 1 | | | | | |
|---|---|---|---|---|---|---|
| | Client | | | | Server/Cloud | |
| Step No | carried out in relation to | Action carried out on the client | Action on carried out on the client Embodiments | Notes, Details | Action carried out on the server | Example |
| 1 | complete data (file) | | | Initialization: clear data block list for this file | | A file of 100 kB, for example |
| 2 | complete data (file) | Sub-division of data into data blocks of a predetermined size | | It may be possible to select from different sizes. | | data blocks of 10 * 10 kB, for example |
| 3 | optional each data block | Compression of the data block | | | | 10 kB become 5 kB, for example |
| 4 | optional each data block | Generation of key base information based on the unencrypted data block using an information generation rule | Alternative, if step 3 is carried out: using compressed data block and/or data block changed according to a predefined system as a base for an information generation rule | Allows small values (because of compression) for saving the decryption information - optionally several information generation rules can be selected; specific information generation protocol is then specifically selected each time by a random generator | | The 128 bit portion of the Skein hash of the unencrypted data block, such as "UVWXYZ0987654321", for example; hash of the compressed block is faster, as the block size is smaller, and better, as the brute force source text is not directly known - the compression of identical data does not necessarily always yield the same result, however. |
| 5 | if step 4 is carried out - each data block | Generation of a data block key based on the generated key base information using a key generation rule | An intentional deceleration can be included in this step to reinforce (more secure) the key base information. | The key generation rule can be selected from a predetermined number of key generation protocols. | | To obtain a 256 bit key, decelerating the path at the same time to obtain reinforced 128 bit key base information: SHA256 (SHA512(SHA512(SHA512(key base information) + 'A') + 'BC') + 'DEF') + 'Z') z.B. = "werfufng9otrilekU5util128exs2lpy" |
| 6 | if step 4 is not carried out - each data block | Generation of a data block key based on the unencrypted data block using a key generation rule | If step 3 is carried out, the key generation rule may also point to the compressed data block. | The key generation rule can be selected from a predetermined number of key generation rules. | | Skein256(unencrypted data block), for example. SHA3 finalists are faster than SHA2 = e.g. "+Z(9)S" |
| 7 | if step 3 is carried out - each data block | Encryption of the compressed data block using the generated data block key to obtain an encrypted data block, using an encryption rule. | | The encryption rule can be selected from a predetermined number of encryption rules. | | e.g. AES256(compressed Datenblock) with data block key and CFB |

-continued

Sequence of actions for communicating data to the server
only valid for alternative 1

| | | Client | | | Server/Cloud | |
|---|---|---|---|---|---|---|
| Step No | carried out in relation to | Action carried out on the client | Action on carried out on the client Embodiments | Notes, Details | Action carried out on the server | Example |
| 8 | if step 3 is not carried out - each data block | Encryption of the compressed data block using the generated data block key to obtain an encrypted data block, using an encryption rule. | | The encryption rule can be selected from a predetermined number of encryption rules. | | e.g. AES256(compressed Datenblock) with data block key and CFB |
| 9 | each data block | Generation of a unique data block ID value based on the unencrypted data block and the selected information generation, key generation, and/or encryption rule(s), and assigning the generated data block ID value to the encrypted data block using a data block ID generation rule predetermined for each user. | Generation of a unique data block ID value based on the encrypted data block as data block ID generation rule (this way any subsequent manipulation by fake uploads to the server can be excluded). | If the data block ID value is generated based on the unencrypted data block, it cannot be validated by the server, which means that the server has to trust all the users - users can assign incorrect data block ID values to encrypted data blocks, thus causing damage to the data of other users. | | Skein256(encrypted data block), for example. SHA3 finalists are faster than SHA2 = e.g. "1234567890ABCDEFGHIJKLMNOPQRSTUV" |
| 10 | each data block | Sending of the unique data block ID value to the server | | The data block ID value should be sent via a secure connection - only a minimum of information should be communicated to the server. | | e.g. "?" + data block ID value "? 1234567890ABCDEFGHIJKLMNOPQRSTUV" |
| 11 | each data block | | | According to claim 1, the server may respond YES or NO; the data block ID value then remains unchanged in the subsequent steps on the client - the advantage of the incremented data block ID value consists in subsequently smaller and compressible data block ID values. | Verification whether the encrypted data block assigned to the data block ID value is already existing on the server and response to the client. | e.g. RETURN "SELECT 'incremented data block ID value' FROM 'encrypted data blocks' WHERE 'hash_encrypted data block' =" + data block ID value |
| 12 | each data block | Verification of the response of the server and uploading the encrypted data block, if it is not existing on the server. | | | | e.g. only if the value communicated back by the server = 0: uploading the encrypted data block. |
| 13 | | | | Returning the incremented data block ID value to the client to confirm that the process has been completed. | Reverification of the hash value of the data block (to avoid that the same data are uploaded twice by the user). | Saving in the database or in the file system, for example. In the first case, corresponding SQL statements are executed (Insert into . . . ). |

-continued

Sequence of actions for communicating data to the server
only valid for alternative 1

| | | Client | | | Server/Cloud | |
|---|---|---|---|---|---|---|
| Step No | carried out in relation to | Action carried out on the client | Action on carried out on the client Embodiments | Notes, Details | Action carried out on the server | Example |
| | | | | | Saving the encrypted data block. | |
| 14 | | Inclusion of the unique data block ID value in the data block list to be uploaded to the server. | optionally: The data block ID value is replaced by the incremented data block ID value returned by the server. | | | e.g. the binary data block ID value "1234567890ABCDEFGHIJKLMNOPQRST UV" is replaced by the numbers 4567 returned by the server –> add 4567 at the end of the list of data blocks |
| 15 | if step 4 is carried out - each data block | Storage of the data block ID value and the key base information in a data block key list, which may be part of the data block list, if these elements are not already included in this list | The key base information is part of the data block list (is, for example, added at the end of each data block ID value). | The hash value of the encrypted data block calculated by the client is preferably also included in this list, as first comparisons can then be carried out on the client based on this list and the existance of data blocks which are already known does not have to be verified on the server. | | e.g. . . . , 4567 - UVWXYZ0987654321, . . . data block ID value was replaced by the value returned by the server. |
| 16 | if step 4 is not carried out - each data block | Storage of the data block ID value and the key base information in a data block key list, which may be part of the list of data and data blocks, if these elements are not already included in this list | The key base information is part of the data block list (is, for example, added at the end of each data block ID value). | The hash value of the encrypted data block calculated by the client is preferably also included in this list, as first comparisons can then be carried out on the client based on this list and the existence of data blocks which are already known does not have to be verified on the server. | | e.g. . . . , 1234567890ABCDEFGHIJKLMNOPQRSTU V - 58thglifewe8fdmnre539128wialqwy<, . . . e.g. The server just returns YES/NO, which means that the originally calculated data block ID value has to be stored. |
| 17 | | Encryption of the data block list using a data block list key, said key being generated based on a rule for generating data block list keys which is only managed and known to the user. | The data block list key is either calculated to vary for each data block list or a specific initialization vector is used for each data block list. | loop of steps 3 to 16 for all data blocks The advantage of the embodiments consists in the fact that it becomes impossible for third parties to identify the data block ID value in histories of data block lists at the position of which the first change, deletion, or insertion was executed. | | The current date of change stored on the server of the respective list of data and data block list may, for example, serve as input vector or as a base for a key for the data block list. |
| 18 | | Encryption of the data block key list using the user key I | | The use of initialization vectors or of different keys does not offer any additional advantage, as there are no histories. | | |
| 19 | | Upload of the encrypte data block list and of the encrypted data block key list from the | | The unencrypted data blocks, the unencrypted data block list, the unencrypted data block key list, the generated data block key, the user | | |

| Step No | carried out in relation to | Action carried out on the client | Action on carried out on the client Embodiments | Notes, Details | Action carried out on the server | Example |
|---|---|---|---|---|---|---|
| 20 | | client to the central server | | key and the data block list key rule, as well as the key base information, if generated, remain exclusively on the client. The data block key list can be stored in the table "data block key list" as a data record for each distinct data block. | Storage of the encrypted data block list and of the encrypted data block key list. | e.g. one file version corresponds to one line in the table "Lists of Encrypted User Files", the list of data and data blocks is stored as an encrypted text column. |

APPENDIX B

Description of the Steps of the Excel Files of Alternative 2, the Invention as Claimed Description of the Steps of the Excel Files of Alternative 2, the Invention as Claimed Step 1

Generate userKey for encryption from the combination of userName and Password using oneway-functions Step 2

Generate a paymentKey from the userKey using oneway-functions and ask the server to accept it (e.g. ask if it's a valid key)

Step 3

Drop a file to be uploaded to the server

Step 4

Get a list of all fileIDs the user has by binary-searching the last fileID of the user take the numbers 1, 512, 1024, 2048, 4096, 8192, 16384 and 32768 and crypt it with the userKey ... (the number of parameters is variable!)

send the encrypted numbers to the server, best sorted by the encrypted ASCII-code the server will answer how many of this encrypted values he found, not knowing which user it is or which numbers are asked.

This is possible since every number will be encrypted as a different random value within a user and every user will encrypt the same numbers different than other users because of his different user-Key if the server answers e.g. 8, we know the user has more than 32768 files and we repeat the step with bigger values if the server answers e.g. 3, we know the has more than 1024 files bit less than 2048 files we repeat the step 4 with values within this range using the binary search until we know the exact number of files the binary search ensures that we can find any number (any fileID) between 0 and 4.294.967.296 (2^92) within maximum 32 seek-steps. Since we use 8 parameters we need only up to four requests to the server. if we know the value can only be e.g. between 4 and 7, we will fill the other parameters with random values Step 5

Get the last existing fileID so we take the next number as fileID and encrypt it with the userKey as the new fileID Step 6

Retrieve the keybasis-information of the file by generating the very high speed but random-number-generation Murmurhash3 128-bit hash of the unencrypted file Step 7

Retrieve 256-bit FileKey from the 128-bit keybasis-information by doing a number of hash-rounds on the keybasis-information (can be a fast variant of pkcs#5)

Step 8

Split the file into randomized data block sizes between a minimum value and a maximum value, this ensures that the average data block size can be reached as the middle of this two values.

One implementation is to get the hash of file key mixed with salt and take every three byte of this hash as a random number between 0 and 16.777.216. From this random number we can easily calculate the data block size which can be any size between e.g. 50 kilobyte and 4 megabyte, means in average about 2 megabyte.

For large files we can generate a new hash of the previously generated hash to get more random numbers, so we ensure the data block lengths are random but for the same file all users will generate the same block-lengths. There is no information about the last data blocks of a file without the need to fill up the last block with empty bytes.

Step 9

For the first block test if it is compressible using any compression-algorithm like ppmd or lzma ... in this case we use LZ4, which is an extremely fast algorithm with not the best but a still acceptable compression. If this first data block can be compressed for at least a minimum number of percentages, we will save a flag and compress all other data blocks too. If the first block can't be compressed for at least a given number of percents normally there will be no chance to compress the other blocks (the rest of the file) and so the flag of compression will be set to zero.

Step 10

For each unencrypted data block: encrypt the as appropriate compressed data block with the file key which was generated from the keybasis-information and AES256

Step 11

For each encrypted data block: get the hash of the encrypted data block as the data block-ID using an secure hash (e.g. SHA256) to ensure there will not be any double datablock-ID-values Step 12

For each data block-ID: generate a deletion-key for this datablock-ID as of e.g. the hash of (datablockID concatenated with the userKey)->it must be a values only the user can calculate. It can also be any random value and the users stores this values together with the data block, but there is no benefit compared with a calculate-able value—on the contrary only more cost of storage.

Step 13:

For each encrypted data block: generate the block-control-key for this data block by building the hash of the XOR (encrypted-block-content and users-payment-key). We can use any hash-function which produces random values—e.g. the very high speed Murmur-3Hash 128 bit.

Step 14

For each data block: send the data blockID, the payment-Key, the deletion-key and the control-key for this data block to the server and get one of at least the following answers as response from the server:

14.1.) datablockID means data block-hash and thereby the block-content not stored on the server->the user has to upload the block content the server stores the block-content, the data block-ID as primary key (for faster requests) and an usage-XOR-value. This usage-XOR-value is for example the hash of the concatenation (data block-ID and the deletion-key the user sent to the server).

Then the server stores another record within a new table which is the hash of the concatenation of (payment-key, data block-ID and the deletion-key the user sent to the server).

So the server has a column for every data block which column holds a one-way-random-number or is zero. if the column-value is zero, the data block isn't used by anyone and can be deleted. If not zero, at least one user uses this data block.

14.2.) data block-hash found on the server, but the validation of the control-key failed (means the server can't be sure the user really owns this data block and can send a hash value using the block content and an information only the user and the server knows—no one else)->in this case the user also must upload the data block or resend the request with the correct control key.

14.3.) data block-hash found on the server but the user has not enough free space on his payment-key. It's up to the server how to react.

14.4.) data block-hash found on the server, the control-key fits and the user has enough useable space on the server. In this case the server will cut the data block size—which he knows since he has the data block—from the payment key. The server will then store the hash of the concatenation (payment-key and data block-hash)->if any requests for downloads by any user the user must also send the paymentKey. So we can ensure that only users who paid for a data block-space can download this data block. Users won't share their payment-keys with others since they can steal their payment-key.

The server also calculates the hash of the concatenation (datablock-ID and the deletion-key the user sent to the server) and XORs the current usage-XOR-value with the this calculated hash.

The usage-XOR-value is calculated so users can't harm the system by send specially prepared deletion-XOR-values.

Then the server stores another record within a new table which is the hash of the concatenation of (payment-key, data block-ID and the deletion-key the user sent to the server)

If a user wants' to delete a data block later and get back the space for it, he also sends this four parameters to the server, the usage-XOR-values is calculated and the server checks for the hash of the concatenation of (payment-key, data block-ID and the deletion-key the user sent to the server) in the new table. if this hash is found the user every paid for this data block and the usage-XOR-value will be XORed with the usage-XOR-column on the server. Then the space of the deleted data block is added to the payment-key and this found hash is deleted from the new table. So one user can only delete a data block once even though the server does not know about users. If all users deleted a data block, this usage-XOR-value on the server is zero (or the start value) which means the data block can be deleted on the server.

Step 15

For each data block-ID but not for the last data block: concatenate this data block-ID to the data block-list, so the file can be restored later by loading the datablock-IDs from this list from the server and concatenate them in their given order to the final file.

Step 16

Only done for the last data block:
after all other data blocks are checked and ensured they exist on the server, the last data block concatenates is extended by the datablock-list and by the number of data blocks. Since this last datablock-ID would be the last entry of this datablock-list there is no need to add its datablock-ID to the data block-list. upload this last data block as described from step 10 to step 14 and go to step 17

Step 17

Encrypt the filename and the other file information with the userkey—best with an input vector which could be the fileID or the file ID plus paymentkey Step 18

Encrypt the keybasis-information with the userkey—best with an input vector which could be the fileID or the file ID plus paymentkey Step 19

Encrypt the last datablock-ID with the userkey—best with an input vector which could be the fileID or the file ID plus paymentkey, the user only needs the last-datablock-ID and the keybasis-information to restore the whole file Step 20

Upload the fileID, encrypted filename and other information, the encrypted keybasis-information and the encrypted last data block-ID to the server

APPENDIX C

Steps Alternative 2, New File (Invention as Claimed)

| Step | Detail |
| --- | --- |
| Steps alternative 2, new file (invention as claimed) | |
| user / password | user1 / patent |
| Use: User s cryption key | 7EE937D4B48076D22F8F1FE7DCC23B4F1EA70A767019172A49D59456BCE44824 |
| Use: User s payment key on the server | 176D8F5488B53322BE525F2708837EF0AB54586A |
| File dropped | C:\Users\Developer\Desktop\test.file |
| Userkey-crypted file ID 1 | 48C8AC67A88FAEE31AF6B60124603A8D95844721 |
| Keybasis-Info: Murmur128 of uncryted file | 5CF947648CBB6719AA528A6AECD48FE4 |
| Retrieve FileKey from Keybasis-Info | FFF33B882CE0B2381FC47605736D5F02002021A747ED0C14F5CFDEAEAA9BE233 |
| Split file into random-sized blocks | Filesize: 12415432 Byte, Blocks: 5 |
| Block 1: Size: 3062016 Byte | Compress with LZ4 - useful ? |
|     Compression Ratio: | 100 %, new Size: 3072336 Byte |
|     Encrypt with the FileKey | |
|     Hash of crypted block | 2945AF3DE1A2B1F1965EBD320979B49399531D78 |
|     Delete-Key for the datablock (SHA256 of concat(strBlockContentHash, UserKey) | 2E4E6382D8DF5BA98DD70662308B42DCA1AD0C10 |
|     Block-Control-Key for the datablock (Murmur128 of XOR(blockContentCrypted, paymentkey) | 4153B390F575039A3F8393D5107072D3 |
|     −> Server answers: | 1: Block not found on the server, please upload it |
|   - block-hash not found on the server | −> Updload block |
|     −> Server answers: | 16: The block-content saved on the server. User payed for it and paymentkey got crypted linked with the file. |
| Block 2: Size: 2599376 Byte | no sense to compress |
|     Encrypt with the FileKey | |
|     Hash of crypted block | 6AC7FE8CDA12F68A5942B97F3C28BEA0A6437C3D |
|     Delete-Key for the datablock (SHA256 of concat(strBlockContentHash, UserKey) | 306281D89198E60802DA192699F8D86F128FDBBB |
|     Block-Control-Key for the datablock (Murmur128 of XOR(blockContentCrypted, paymentkey) | 924C873E51ED08604A0981EC40AFA70E |
|     −> Server answers: | 1: Block not found on the server, please upload it |
|   - block-hash not found on the server | −> Updload block |
|     −> Server answers: | 16: The block-content saved on the server. User payed for it and paymentkey got crypted linked with the file. |
| Block 3: Size: 1763264 Byte | no sense to compress |
|     Encrypt with the FileKey | |
|     Hash of crypted block | B914430FDDD0B01549C5564FF2B213333AC119BB9D011355E5A01D3E54E295936FED5DF38FD56D08 |
|     Delete-Key for the datablock (SHA256 of concat(strBlockContentHash, UserKey) | |
|     Block-Control-Key for the datablock (Murmur128 of XOR(blockContentCrypted, paymentkey) | 2F08275828D915D9739C1ACBFE95ECFA |
|     −> Server answers: | 1: Block not found on the server, please upload it |
|   - block-hash not found on the server | −> Updload block |
|     −> Server answers: | 16: The block-content saved on the server. User payed for it and paymentkey got crypted linked with the file. |
| Block 4: Size: 3307616 Byte | no sense to compress |
|     Encrypt with the FileKey | |
|     Hash of crypted block | 630062F2F67B767CC042793D0720873053A0093B |
|     Delete-Key for the datablock (SHA256 of concat(strBlockContentHash, UserKey) | 3CEA19E8F548A5B4AC68799F5F8E2EA75B40D779 |
|     Block-Control-Key for the datablock (Murmur128 of XOR(blockContentCrypted, paymentkey) | 518E73D099A43D6668C1DABBBD105AF1 |
|     −> Server answers: | 1: Block not found on the server, please upload it |
|   - block-hash not found on the server | −> Updload block |
|     −> Server answers: | 16: The block-content saved on the server. User payed for it and paymentkey got crypted linked with the file. |
| Block 5: Size: 1683248 Byte | no sense to compress |
|     Encrypt with the FileKey | |
|     Hash of crypted block | C992D70567F2619017BEAD10D7A56A1B994F04D7 |
|     Delete-Key for the datablock (SHA256 of concat(strBlockContentHash, UserKey) | 727479A623BEA8A3FADD6D73B168923961A38257 |
|     Block-Control-Key for the datablock (Murmur128 of XOR(blockContentCrypted, paymentkey) | F213195162570BEEA2B75051F8B66DED |
|     −> Server answers: | 1: Block not found on the server, please upload it |
|   - block-hash not found on the server | −> Updload block |
|     −> Server answers: | 16: The block-content saved on the server. User payed for it and paymentkey got crypted linked with the file. |
| Last Block finished. | |
| −> the datablock-list is part of the last-block-content | user only needs this block-hash |
| Hash of LAST crypted block | C992D70567F2619017BEAD10D7A56A1B994F04D7 |
| User-key crypted Filename with InputVector FileID+paymentkey | 696F0A871178362858158F9AC32D00954C8CF2ED0BB42283EBAABD14E74094AD0ED2C70FB32DB1A8CF954826261FE73E |

-continued

Steps alternative 2, new file (invention as claimed)

| Step | Detail |
|---|---|
| User-key crypted Keybasis-Info with InputVector FileID+paymentkey | 701B550FC50B28E080C9367DA35188DC |
| User-key crypted Last-Block-Hash with InputVector FileID+paymentkey | 35651C059CE330C2D9E052CBFB4CD8CC1F62A175642EBE8CAE29B96FC08B180E |
| inserted in table user_files | |

APPENDIX D

Steps Alternative 2, File Existing and will be Deduplicated (Invention as Claimed)

Steps alternative 2, file existing and will be deduplicated (invention as claimed)

| Step | Detail |
|---|---|
| Use: User s cryption key | 811DE51F623FD78D3D47FF100CDA2FC1B92C9B562AD371E6C7456425BD3D106C |
| Use: User s payment key on the server | A12265EADBBF6D5C765430352D66A6EBD2257E51 |
| File dropped | C:\Users\Developer\Desktop\test.file |
| Userkey-crypted file ID 1 | 1E82D728D9D190F588CA9D0383260B818B59C853 |
| Keybasis-Info: Murmur128 of uncryted file | 5CF947648CBB6719AA528A6AECD48FE4 |
| Retrieve FileKey from Keybasis-Info | FFF33B882CE0B2381FC47605736D5F02002021A747ED0C14F5CFDEAEAA9BE233 |
| Split file into random-sized blocks | Filesize: 12415432 Byte, Blocks: 5 |
| Block 1: Size: 3062016 Byte | Compress with LZ4 - useful ? |
|    Compression Ratio: | 100 %, new Size: 3072336 Byte |
|    Encrypt with the FileKey | |
|    Hash of crypted block | 2945AF3DE1A2B1F1965EBD320979B49399531D78 |
|    Delete-Key for the datablock (SHA256 of concat(strBlockContentHash, UserKey) | 6AAD7375E4185AD94DDEB8BA0C0ED5B395C0ADF8 |
|    Block-Control-Key for the datablock (Murmur128 of XOR(blockContentCrypted, paymentkey) | 1B9DA264B1129217A7473EEDCF17E1CE |
|    −> Server answers: | 16: The block-content saved on the server. User payed for it and paymentkey got crypted linked with the file. |
|    + block found on the server | convinced that the user realy owns the block |
| Block 2: Size: 2599376 Byte | no sense to compress |
|    Encrypt with the FileKey | |
|    Hash of crypted block | 6AC7FE8CDA12F68A5942B97F3C28BEA0A6437C3D |
|    Delete-Key for the datablock (SHA256 of concat(strBlockContentHash, UserKey) | 975F692875C3A81A574DB34EB3F9A76DC637B205 |
|    Block-Control-Key for the datablock (Murmur128 of XOR(blockContentCrypted, paymentkey) | B131805A4C5B29653724D6ADE2EA35F6 |
|    −> Server answers: | 16: The block-content saved on the server. User payed for it and paymentkey got crypted linked with the file. |
|    + block found on the server | convinced that the user realy owns the block |
| Block 3: Size: 1763264 Byte | no sense to compress |
|    Encrypt with the FileKey | |
|    Hash of crypted block | B914430FDDD0B01549C5564FF2B213333AC119BB |
|    Delete-Key for the datablock (SHA256 of concat(strBlockContentHash, UserKey) | 054E2895C95FE239009DCBCF6ECEE106A9B28F6F |
|    Block-Control-Key for the datablock (Murmur128 of XOR(blockContentCrypted, paymentkey) | 5560E13C9E3D905161E5834C456C4804 |
|    −> Server answers: | 16: The block-content saved on the server. User payed for it and paymentkey got crypted linked with the file. |
|    + block found on the server | convinced that the user realy owns the block |
| Block 4: Size: 3307616 Byte | no sense to compress |
|    Encrypt with the FileKey | |
|    Hash of crypted block | 630062F2F67B767CC042793D0720873053A0093B |
|    Delete-Key for the datablock (SHA256 of concat(strBlockContentHash, UserKey) | 073488142B491F039BD7E970119D4D014E5DA49D |
|    Block-Control-Key for the datablock (Murmur128 of XOR(blockContentCrypted, paymentkey) | 1D1366E369CF279E7368C7419F38AB22 |
|    −> Server answers: | 16: The block-content saved on the server. User payed for it and paymentkey got crypted linked with the file. |
|    + block found on the server | convinced that the user realy owns the block |
| Block 5: Size: 1683248 Byte | no sense to compress |
|    Encrypt with the FileKey | |
|    Hash of crypted block | C992D70567F2619017BEAD10D7A56A1B994F04D7 |
|    Delete-Key for the datablock (SHA256 of concat(strBlockContentHash, UserKey) | 9277664F5E7C40CD7EA813238440D9B622144397 |
|    Block-Control-Key for the datablock (Murmur128 of XOR(blockContentCrypted, paymentkey) | 150AE76D4CDA65E613FB7227D5C791EC |

Steps alternative 2, file existing and will be deduplicated (invention as claimed)

| Step | Detail |
|---|---|
| –> Server answers: | 16: The block-content saved on the server. User payed for it and paymentkey got crypted linked with the file. |
| + block found on the server | convinced that the user realy owns the block |
| Last Block finished. | |
| –> the datablock-list is part of the last-block-content | user only needs this block-hash |
| Hash of LAST crypted block | C992D70567F2619017BEAD10D7A56A1B994F04D7 |
| User-key crypted Filename with InputVector FileID+paymentkey | E0DDA7CAB3076C9200FAFE2D7C274826A5F07062D DA0B06E8B2396B83902447516AB628CDE0F1A360F DAF7374C7C3865 |
| User-key crypted Keybasis-Info with InputVector FileID+paymentkey | EE7903E42ED8AD193BFC98B8A8AA7399 |
| User-key crypted Last-Block-Hash with InputVector FileID+paymentkey | 470B53EB9BEBC965C2C5B23882F8B1AD183C2BC0B EC1CCE98968AAA43F63A987 |
| inserted in table user_files | |

APPENDIX E

Alternative 2, Example of Data Storage on Server and Client (Invention as Claimed)

alternative 2, example of data storage on server and client (invention as claimed)

| saved on the SERVER | Filelist of user1/patent |
|---|---|
| FileID | 7B5A62D25536D245D78F8729561411F000000000 |
| Keybasis-Information | 701B550FC50B28E080C9367DA35188DC |
| BlockID-LastBlock (32 byte case AES-Blocksize) | 35651C059CE330C2D9E052CBFB4CD8CC1F62A175642EBE8CAE29B96FC08B180E |

| uncrypted data on Client | Filelist of user1/patent |
|---|---|
| FileID | 1 |
| Keybasis-Information | 5CF947648CBB6719AA528A6AECD48FE4 |
| BlockID-LastBlock (20 Byte) | C992D70567F2619017BEAD10D7A56A1B994F04D7 |

| saved on the SERVER | Filelist of user2/patent |
|---|---|
| FileID | EA178764DCAAE56E81B01999CF17ED8200000000 |
| Keybasis-Information | EE7903E42ED8AD193BFC98B8A8AA7399 |
| BlockID-LastBlock (32 byte case AES-Blocksize) | 470B53EB9BEBC965C2C5B23882F8B1AD183C2BC0BEC1CCE98968AAA43F63A987 |

| uncrypted data on Client | Filelist of user2/patent |
|---|---|
| FileID | 1 |
| Keybasis-Information | 5CF947648CBB6719AA528A6AECD48FE4 |
| BlockID-LastBlock (20 Byte) | C992D70567F2619017BEAD10D7A56A1B994F04D7 |

The invention claim is:

1. A process for storing data on a central server, a plurality of users of said server each having a user password which is at least used for generating a user key and at least one client with data saved thereon being respectively assigned to at least some of these users and, as required, at least some of these data being subdivided into at least one data block to be uploaded, and, based on a unique data block ID value identifying each data block, it is determined whether a corresponding data block is already present on the server, the data blocks not being present on the server being uploaded to said central server, a data block list to be uploaded being compiled and uploaded to the central server, based on which data can be regenerated in their original form by a data recovery step following a request for data stored on the central server by the user,
   wherein a file key is generated using a key generation rule which uses an unencrypted file consisting of at least one data block as an integral component for generating said file key;
   the following steps are carried out for each unencrypted data block on the client, wherein the unencrypted data block is first compressed, in order to determine the data blocks and the data block list to be uploaded to the central server:
   encrypting the unencrypted data block using the generated file key to create an encrypted data block based on a predefined encryption rule;
   generating a unique data block ID value based on the encrypted data block using a method known to the server and assigning of this unique data block ID value to the encrypted data block using a data block ID generation rule predetermined for each user in a data block ID value generating step,
   communicating this unique data block ID value from the client to the central server in a data block ID value communication step in order to receive a response from the server as to whether the encrypted data block assigned to this data block ID value has to be uploaded to the server, and, based on this response, uploading at least parts of the encrypted data block or information generated there from or not;

saving said unique data block ID value in the data block list, which is to be uploaded to the server;

and wherein the following steps are carried out after having completed the above steps for each unencrypted data block:

encrypting the data block list using the file key;

generating a unique data block list ID value from the encrypted list of data blocks and assigning said value to the encrypted list of data blocks;

encrypting the data block list ID value using the user key, which is generated based on a data block list ID value key rule, said rule being managed by and only known to the user;

encrypting the file key using the user key, which is generated based on a data block list ID value key rule, said rule being managed by and only known to the user;

uploading the encrypted data block list and the encrypted data block list ID value as well as the encrypted file key from the client to the central server and assigning the encrypted file key to the encrypted data block ID value;

the unencrypted data blocks, the unencrypted data block list, the unencrypted file key, the unencrypted ID value of the list of data blocks and the user key remaining exclusively on the client;

and, in the data recovery step, the server sending the data which are stored on the server in their encrypted form, the server being not able to decrypt them, to the client, so that data recovery is only carried out on the client.

2. The process according to claim 1, wherein key basis information is generated based on the unencrypted file using an information generation rule and in that the file key is generated based exclusively on the key basis information, said information being encrypted and uploaded instead of the file key, requiring less storage space than the file key.

3. The process according to claim 2, wherein said key basis information is a sufficiently long, predetermined portion of a hash value of the unencrypted file.

4. The process according to claim 3, wherein the file key is generated based on the key basis information by obtaining the result of a predetermined number of consecutive one-way functions, using at least the key basis information as an input value for the first one-way function, at least one of the results of the previous one-way functions being used as an input value for the subsequent one-way function.

5. The process according claim 1, wherein the data block sizes of one file are variable and are computed based on the file itself and are, thus, not predictable, but random for each file.

6. The process according to claim 1, wherein a sufficiently long hash value is generated for computing the data block sizes based on the encrypted file and in that the data block sizes are each constituted by parts of said hash value.

7. The process according to claim 1, wherein the list of data blocks is added to the last data block and in that the client saves the data block ID value of said last data block instead of the ID value of the list of data blocks.

8. The process according to claim 1, wherein the data block ID value corresponds to the hash value of the encrypted data block.

9. The process according to claim 1, wherein the client carries out the following steps for each data block:

determining the hash value of the unencrypted data block and comparing this hash value to one client data block hash information item, and wherein the steps of generating the data block ID value and of communicating said data block ID value are dropped, if the determined hash value is found among the new information on the client, and wherein the determined hash value is entered into the list for the respective data block ID value and the steps of generating the data block ID value and of communicating said data block ID value are carried out, if the determined hash value is not found among the new information on the client, the client data block hash information being neither communicated nor uploaded to the server.

10. The process according to claim 1, wherein the server, if a data block that the client wants to upload to the server is already present on the server, requests from the server the hash of the encrypted data block in combination with an item of information which must only be known to the client and the server, in order to make verify that the client possesses the data block, without the data block being uploaded.

11. The process according to claim 1, wherein the data block ID values, based on which it is determined whether the respective data blocks are already present on the server, are first generated on the client and then communicated to the server in a random sequence for the respective request.

12. The process according to claim 1, wherein a constant number of bytes are removed from a constant position of each unencrypted data block and included in the data block list as an additional item of information for each data block.

13. The process according to claim 1, wherein a variable number of bytes are removed from a variable position of each unencrypted data block and included in the data block list as an additional item of information for each data block in connection with the information from which position these bytes were removed.

14. The process according to claim 1, wherein information assigned to the unencrypted data block, which may be publicly available, is used as a basis for calculating an initialization vector for a chaining process for encrypting the unencrypted data block and in that the initialization vector and a chaining process are applied.

15. The process according to claim 1, wherein information assigned to the data block list, which may be publicly available, is used as a basis for calculating an initialization vector for a chaining process for encrypting the data block list and in that the initialization vector and a chaining process are applied.

16. The process according claim 1, wherein the data block list is expanded by random, correspondingly marked, irrelevant data of variable lengths for each data block.

17. The process according to claim 1, wherein a random key manipulation value, which changes the data block key, is determined for each unencrypted data block before encrypting the same and in that said random key manipulation value is stored in the data block list.

18. The process according to claim 1, wherein the compressed data block is subdivided into data sub-blocks of a predetermined size, said data sub-blocks being assembled in a sorted order to form a sorted data block, said sorted data block being encrypted and, if necessary, uploaded to the server, and wherein the user stores a data block order value for each data block as an expansion of the data block list, said value containing the information concerning the order in which the data sub-blocks are to be reassembled to form a compressed data block.

19. The process according to claim 1, wherein the unencrypted data block is pre-sorted by a reversible transformation and in that restoration information is obtained and in that said pre-sorted data block is compressed and encrypted and in that said restoration information, based on which the pre-sorted data block can be restored as an unencrypted data block, is added as additional information to the data block list for each data block, which means that the pre-sorted data block is not expanded by this information.

* * * * *